United States Patent
Kinoshita (12) 
(10) Patent No.: US 6,922,571 B1
(45) Date of Patent: Jul. 26, 2005

(54) MOBILE TELEPHONE SYSTEM CONFIGURED TO CONFIRM RECEIVER SPEED CONDITIONS

(75) Inventor: Katsumi Kinoshita, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 259 days.

(21) Appl. No.: 10/048,461
(22) PCT Filed: Jun. 12, 2000
(86) PCT No.: PCT/JP00/03810
§ 371 (c)(1), (2), (4) Date: Feb. 6, 2002
(87) PCT Pub. No.: WO01/97550
PCT Pub. Date: Dec. 20, 2001
(51) Int. Cl.[7] .............................. H04Q 7/32
(52) U.S. Cl. .................. 455/567; 455/412.2; 455/441; 455/466
(58) Field of Search .............................. 455/413, 457, 455/466, 567, 561

(56) References Cited

U.S. PATENT DOCUMENTS 6,108,532 A * 8/2000 Matsuda et al. ............ 455/413
6,477,383 B1 * 11/2002 Jyogataki et al. ........... 455/466
6,640,115 B1 * 10/2003 Fujimoto et al. ........... 455/567

FOREIGN PATENT DOCUMENTS

| JP | 07-030967 | 1/1995 |
|---|---|---|
| JP | 8-149550 | 6/1996 |
| JP | 10-154955 | 6/1998 |
| JP | 11-98575 | 4/1999 |
| JP | 11-164361 | 6/1999 |
| JP | 11-196475 | 7/1999 |
| JP | 11-215053 | 8/1999 |
| JP | 11-289580 | 10/1999 |

* cited by examiner

Primary Examiner—Fan Tsang
Assistant Examiner—Lisa Hashem
(74) Attorney, Agent, or Firm—Oblon, Spivak, McClelland, Maier & Neustadt, P.C.

(57) ABSTRACT

In response to a call from a telephone terminal (4) to a mobile terminal (1), a mobile phone network (2) confirms the moving state of the mobile terminal (1). If the mobile terminal (1) is found to be moving, the mobile phone network (2) notifies the mobile terminal (1) of the fact that a call was received by the mobile terminal (1) and also notifies the caller's telephone terminal (4) of the fact that the called party's mobile terminal (1) is moving, and causes the caller's terminal (1) to call again after the lapse of a predetermined time. If the called party's terminal (1) is found to be not moving, the mobile phone network (2) transmits a calling signal to the mobile terminal (1).

8 Claims, 5 Drawing Sheets

MOBILE TELEPHONE SYSTEM CONFIGURED TO CONFIRM RECEIVER SPEED CONDITIONS

TECHNICAL FIELD

This invention relates to a telephone system which is provided with a mobile terminal and a mobile phone network.

BACKGROUND ART

Figure 1:
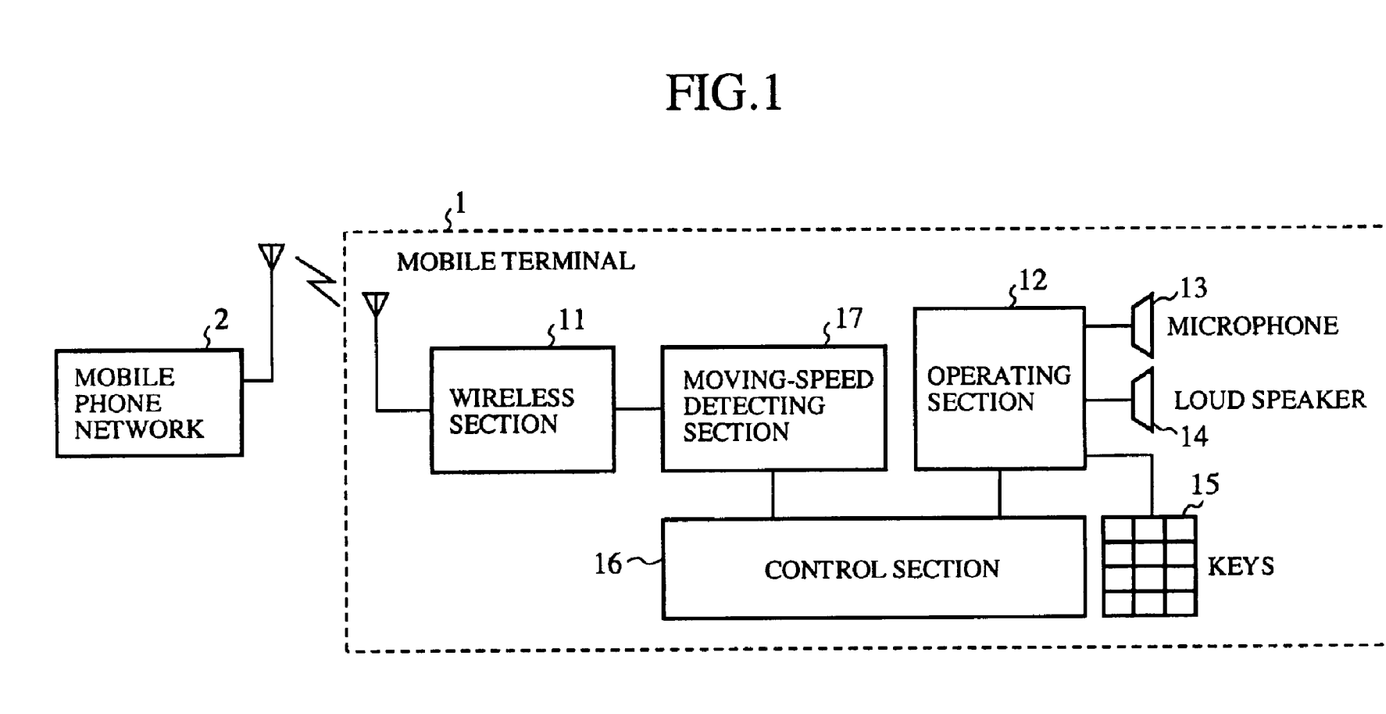
FIG. 1 is a block diagram showing an arrangement of a conventional telephone system.

FIG. 1 is a block diagram showing an arrangement of a telephone system as disclosed in Japanese Patent Application Laid-Open No. 98575/1999. In the figure, reference numeral 1 denotes a mobile terminal, and reference numeral 2 denotes a mobile phone network inclusive of a base station or the like which performs transmission and reception of radio signals to and from the mobile terminal 1.

In the mobile terminal 1, reference numeral 11 denotes a wireless section for performing transmission and reception of radio signals to and from the mobile phone network 2. Reference numeral 12 denotes an operating section for processing inputs from a microphone 13, outputs to a loud speaker 14, and inputs from keys 15 for entering various setting inputs. Reference numeral 16 denotes a control section that controls transmission and reception in wireless communications and also controls reception of voices through the microphone 13, driving of the loud speaker 14, inputting through the keys 15 or the like. Reference numeral 17 denotes a moving-speed detecting section for detecting a moving speed of a mobile body such as an automotive vehicle which has mounted on board the mobile terminal 1.

A description will now be made about the operation.

If the moving-speed of the mobile body which is detected by the moving-speed detecting section 17 has exceeded a predetermined value and if this state continues for a predetermined period of time or more, the transmitting function of the wireless section 11 is stopped. If the detected moving speed has fallen to the level below a predetermined value and this state continues for a predetermined period of time or more, the stoppage of the transmitting function of the wireless section 11 is released. Further, in a state in which the transmitting function is stopped, communication is performed through a second communicating means such as paging service function, automatic answering telephone service, short mail service, call reception transfer service and so on.

As a method for the moving-speed detecting section 17 to detect the moving speed, there is, for example, a method as disclosed in Japanese Patent Application Laid-Open No. 215053/1999 in which the moving speed is estimated by a change in the transmitting power, or a method as disclosed in Japanese Patent Application Laid-Open No. 149550/1996 in which a fading pitch (period) of a standby receiving channel is detected.

In this manner, by determining whether or not the mobile body is moving based on the duration time of its moving speed above a predetermined value, the transmitting function is stopped, and the communication means is automatically switched to the second communicating means. Therefore, in the case where the mobile terminal 1 receives a call, the user of the mobile terminal 1 cannot determine as to whether or not the call is of an urgent nature in a state in which the switching has already been changed to the second communicating means. Due to this, the user of the mobile terminal 1 will not start to take a voluntary action to enable him or her to commence the conversation in reply to the received call, for example, when driving an automotive vehicle, by parking it on the roadside so that the moving speed becomes lower than a predetermined value and holding the value for a predetermined period of time.

In this case, the message from the caller will be received by the above-described second communicating means. However, since the user of the mobile terminal 1 would not necessarily take an i immediate action to check this message for the above-described reason, the confirmation of the contents of the message is sometimes delayed or the received message itself would be left forgotten.

Further, even in the case where a return reply to the caller is required, the user of the mobile terminal 1 may sometimes forget the necessity to do so. In this manner, the caller will have to call again thereafter on the assumption that the called party might have forgotten to confirm the message or might have forgotten to reply by return call.

Since the conventional telephone system is arranged as described above, there is such a problem that despite the state in which the telephone system itself is capable of providing communications, it cannot surely perform the conversation as soon as possible on an emergency case or the like.

This invention has been made to solve the forgoing problems, and it is an object of the present invention to provide a telephone system which enables, in a state in which the telephone system itself is capable of providing a conversation connection but is incapable of conversation because the mobile terminal is moving, the user of the mobile terminal 1 to take a voluntary action to make a conversation even without executing a repeated calling on the part of the caller; and which enables the user, when the mobile terminal 1 has come to a state in which a secure communication is enabled, to quickly and securely perform the conversation with the caller.

DISCLOSURE OF INVENTION

A telephone system according to this invention is the one providing communications between a caller's terminal and a called party's mobile terminal by way of a mobile phone network, wherein when a call is placed from the caller's terminal to the mobile terminal, the mobile phone network confirms a moving state of the mobile terminal; and wherein in the case where the mobile terminal is found to be moving, the mobile phone network notifies the mobile terminal of the fact that a call was received and also notifies the caller's terminal of the fact that the mobile terminal is moving, to thereby cause the caller's terminal to place another call after a lapse of a predetermined time; and in the case where the mobile terminal is found to be not moving, the mobile phone network transmits a calling signal to said mobile terminal.

Due to this arrangement, there is obtained such an effect that, even when the mobile terminal has received a call in a state in which the conversation connection cannot be made because the mobile terminal is moving, it is possible for the user of the mobile terminal to assuredly make a conversation connection as soon as possible, and also that the user of the caller's terminal need not place calls repeatedly.

The telephone system according to this invention is characterized in that one of the mobile terminal and the mobile phone network comprises the moving-speed detector for detecting a moving speed of the mobile terminal.

Due to this arrangement, there is obtained such an effect that the mobile phone network can determine whether the mobile terminal is moving or not and that the control of the conversation connection can be made based on the result of the determination.

The telephone system according to this invention is characterized in that the mobile terminal which has been notified of the fact that a call was received from the mobile phone network notifies the user of the mobile terminal of the received call.

Due to this arrangement, there is obtained such an effect that since the user of the called party's mobile terminal takes a voluntary action to enable conversation, the conversation connection can surely be made as soon as possible.

The telephone system according to this invention is characterized in that if the mobile terminal is not moving and the caller's terminal has already placed another call, the mobile phone network notifies the caller's terminal of the fact that a conversation connection is started.

Due to this arrangement, there is obtained such an effect that the starting of the conversation connection can be notified to the standby user of the caller's terminal.

A telephone system according to the present invention is the one for providing communications between a caller's terminal and a called party's mobile terminal by way of a mobile phone network, wherein when a call is placed from the caller's terminal to the mobile terminal, the mobile phone network confirms a moving state of the mobile terminal; and wherein in the case where the mobile terminal is found to be moving, the mobile phone network notifies the mobile terminal of the fact that a call was received, and also makes a re-confirmation of the moving state of the mobile terminal after a lapse of a predetermined time; and in the case where the mobile terminal is found to be not moving, the mobile phone network transmits a calling signal to the mobile terminal.

Due to this arrangement, there is obtained such an effect that even when a call has been received in a state in which a conversation connection is not made due to the fact that the mobile terminal is moving, a conversation connection can surely be made as soon as possible and that the user of the caller's terminal need not try to place calls repeatedly.

The telephone system according to this invention is characterized in that one of the mobile terminal and the mobile phone network comprises the moving-speed detector for detecting a moving speed of the mobile terminal.

Due to this arrangement, there is obtained such an effect that the mobile phone network can determine whether the mobile terminal is moving or not and that the control of the conversation connection can be made based on the result of the determination.

The telephone system according to this invention is characterized in that the mobile terminal which has been notified of the fact that a call was received from the mobile phone network notifies the user of the mobile terminal of the received call.

Due to this arrangement, there is obtained such an effect that since the user of the called party's mobile terminal takes a voluntary action to enable conversation, the conversation connection can surely be made as soon as possible.

The telephone system according to this invention is characterized in that, if the mobile terminal is not moving and the mobile phone network has already re-confirmed the moving state of the mobile terminal, the mobile phone network notifies the caller's terminal that a conversation connection is started.

Due to this arrangement, there is obtained such an effect that the starting of conversation connection can be notified to the standby user of the caller's terminal.

BEST MODE FOR CARRYING OUT THE INVENTION

In order to explain this invention in more detail, a description will now be made about the best mode for carrying out this invention with reference to the accompanying drawings.

First Embodiment

Figure 2:
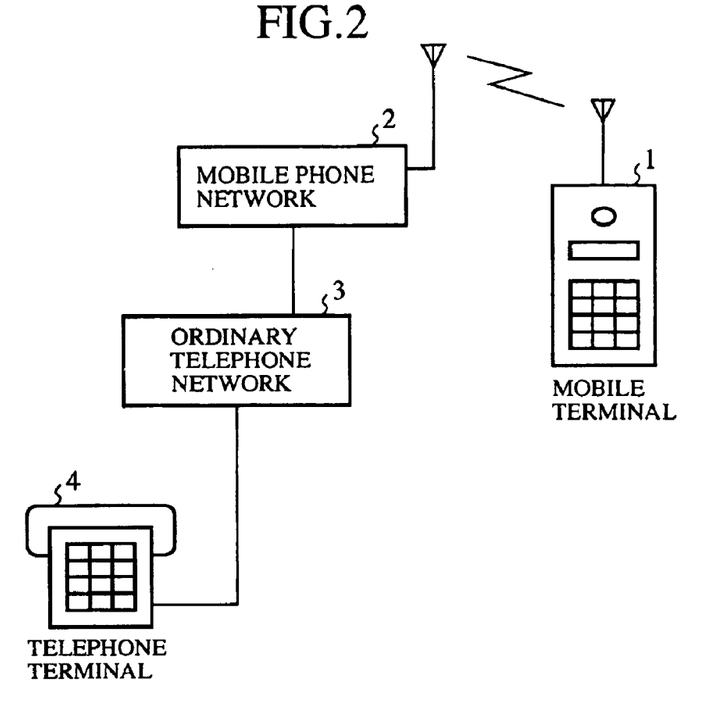
FIG. 2 is a block diagram showing an arrangement of a telephone system according to a first embodiment of this invention.

FIG. 2 is a block diagram showing an arrangement of a telephone system according to a first embodiment of this invention. In the figure, reference numeral 1 denotes a mobile terminal, reference numeral 2 denotes a mobile phone network for making a communication with the mobile terminal, reference numeral 3 denotes an ordinary telephone network, and reference numeral 4 denotes a telephone terminal which is connected to the ordinary telephone network 3. The mobile terminal 1 has the same arrangement as that of the conventional one as shown in FIG. 1 and is provided with a moving-speed detector section 17. It is to be understood that the mobile phone network 2 includes: base stations for directly transmitting to and receiving from the mobile terminal 1; a mobile telephone switching station for performing interconnecting services with the base station; and a gate mobile telephone central station for performing interconnection with the ordinary telephone network 3.

Figure 3:
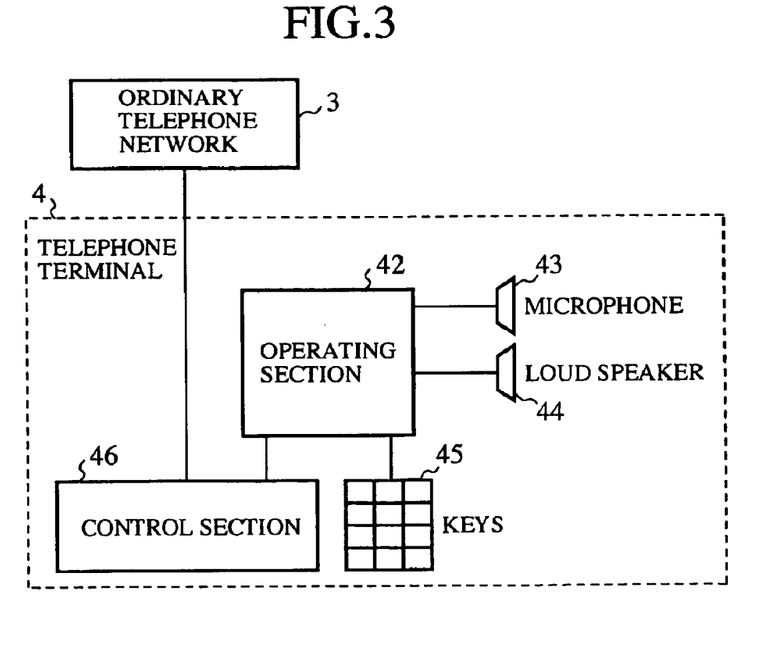
FIG. 3 is a block diagram showing the configuration of a telephone terminal according to the first embodiment of this invention.

FIG. 3 is a block diagram showing the configuration of a telephone terminal 4, which is provided with an operating section 42, a microphone 43, a loud speaker 44, keys 45 and a control section 46, which are similar to those shown in FIG. 1.

A description will now be made about the operation.

Figure 4:
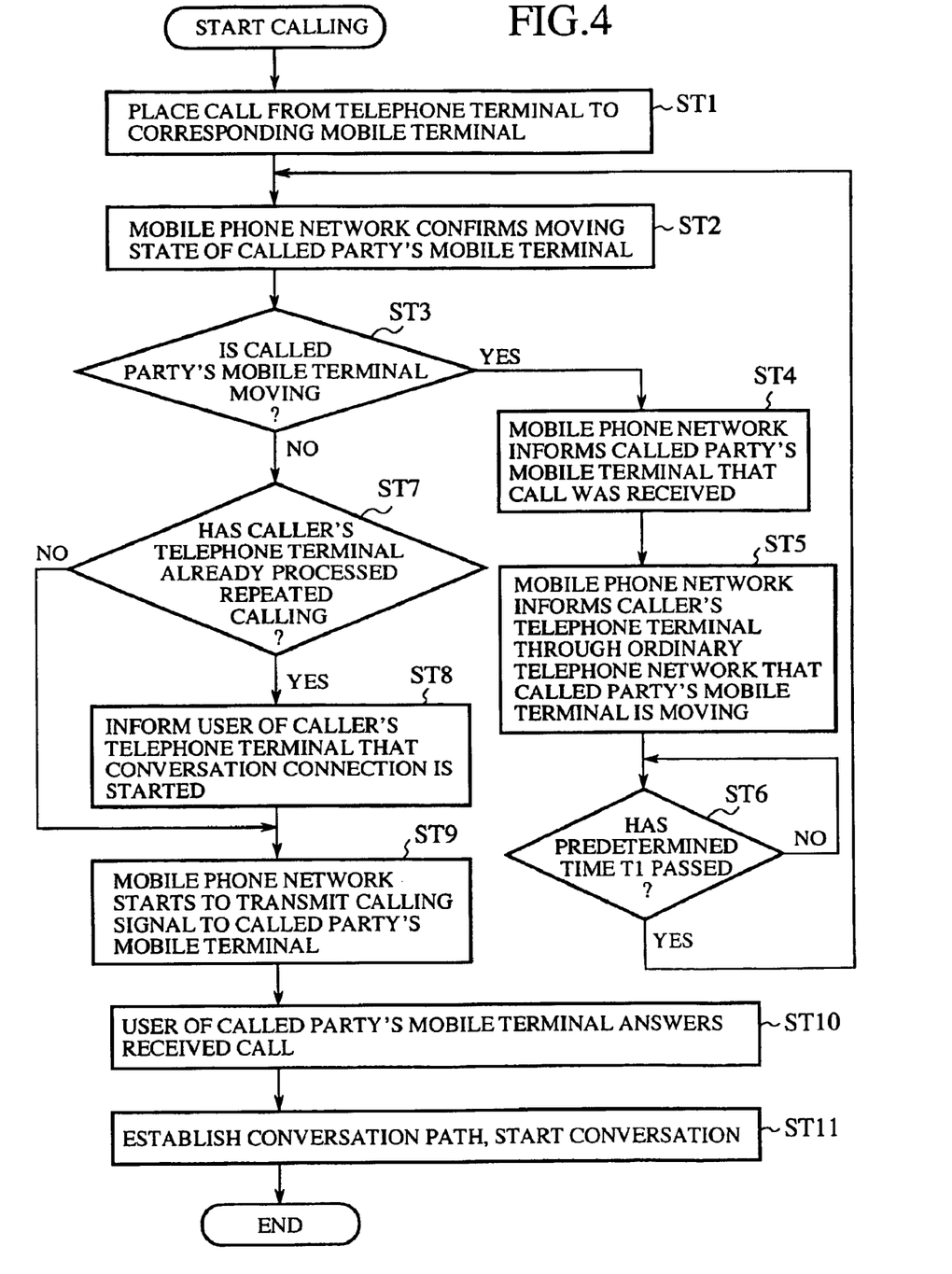
FIG. 4 is a flow chart showing the flow of processing in the telephone system according to the first embodiment of this invention.

FIG. 4 is a flow chart showing the flow of processing in the telephone system according to the first embodiment of this invention. An example is shown here in which a call is placed from the telephone terminal 4 connected to the ordinary telephone network 3 to the mobile terminal 1 through the mobile phone network 2.

In step ST1, calling is placed first from the caller's telephone terminal 4 to the corresponding mobile terminal 1 by entering telephone numbers or the like of an intended receiver of the call. The mobile phone network 2 then confirms in step ST2 the moving state, at this point or up to this point, of the called party's mobile terminal 1. In step ST3, a determination is made as to whether or not the mobile terminal 1 is moving.

At this stage, the moving-speed detector 17 in the called party's mobile terminal 1 detects the moving speed. The mobile terminal 1 appropriately notifies the detected moving speed to the mobile phone network 2 when necessary. The mobile phone network 2 determines that the mobile terminal 1 is moving if the notified moving speed continues for more than a predetermined period of time which is set in advance at more than a predetermined value which is also set in advance. On the other hand, the mobile phone network 2 determines that the mobile terminal 1 is not moving if the detected moving speed continues for more than a predetermined time at less than a predetermined value which is set in advance.

When the mobile phone network 2 has determined that the mobile terminal 1 is moving, then the mobile phone network 2 notifies the called party's mobile terminal 1 in step ST4 that a call was received. At this stage, the mobile terminal 1 automatically notifies the user of the fact that a call was received by means, for example, of a sound from the loud speaker 14, display in a connected or built-in display device, vibration by a vibrator or the like.

Even if the user of the mobile terminal 1 tries to operate at this time to respond to the received call by the operation of the keys or the like, the mobile phone network 2 will not establish the conversation connection because the mobile terminal 1 is moving. Therefore, since the user of the mobile terminal 1 can determine that the conversation connection is not established because the mobile terminal 1 is moving. The user can voluntarily take an action to enable him or her to perform conversation, for example, by parking the automotive vehicle, if the notification was given during his vehicle driving state, in a safe roadside or the like.

In stop ST5, the mobile phone network 2 notifies the caller's terminal 4 through the ordinary telephone network 3 that the called party's mobile terminal 1 is moving. At this stage, the caller's terminal 4 immediately notifies the user of the telephone terminal 4, i.e., the caller by means, for example, of a sound from the loud speaker 44, by display on the connected or built-in display device or the like, that the called party's terminal 1 is moving.

After waiting in step ST6 until a predetermined time T1 has passed, the program returns again to step ST1, where the caller's telephone terminal 4 automatically places a call again to the called party's mobile terminal 1. This predetermined time T1 may be a period which is fixed in advance or varies from time to time by means of a generation of random numbers and so on.

If, as a result of the judgment in step ST3, a determination has been made that the mobile terminal is not moving, the mobile phone network 2 determines in step ST7 as to whether the process of repeated calling by the caller's telephone terminal 4 in steps ST4 through ST6 has at that stage already been performed.

Then, if the process of repeated calling has already been performed, the user of the caller's terminal 4 is in a standby state after the lapse of the predetermined time T1. Therefore, in step ST8, the mobile phone network 2 notifies the user of the caller's telephone terminal 4 through the ordinary telephone network 3 that the conversation connection to the called party's mobile terminal 1 will be started in step ST9, the mobile phone network 2 starts to transmit a calling signal to the called party's mobile terminal At the above-described step ST7, if the process of repeated calling has not been performed yet, the user of the caller's terminal 4 in not in a standby state after the lapse of the predetermined time T1. Therefore, the processing at the above-described step ST9 is preformed by skipping off the above-described step ST8.

In step ST10, when the user of the called party's mobile terminal 1 answers the received call by pushing the keys or the like, the mobile phone network 2 and the ordinary telephone network 3 establish the conversation connection between the terminals of the caller's telephone terminal 4 and the called party's mobile terminal 1, whereby the conversation between the users is started.

In this embodiment, a description has been made about the case in which a call is placed from the caller's terminal 4 which is connected to the ordinary telephone network 3, to the mobile terminal which is connected to the mobile phone network 2. However, it is to be noted that the similar processing can be made in the case where a call is placed from another mobile terminal 1 connected to the mobile phone network 2, instead of from the caller's telephone terminal 4 connected to the ordinary telephone network 3.

As described hereinabove, according to the first embodiment of this invention, even when a call is received in a state in which the conversation connection cannot be made because the terminal is moving, the user of the called party's mobile terminal 1 can take a voluntary action, as a result of the notification in step ST4, to enable him or her to make a conversation, for example, by parking the automotive vehicle, if the notification was given during his vehicle driving state, in a safe roadside or the like. Therefore, such an effect can be obtained that the conversational communication can be made as soon as possible.

Further, according to the first embodiment, the user of the caller's terminal 4, i.e., the caller is automatically notified at the point of time when the called party's mobile terminal 1 has come to a state that he can now have a conversation connection and, consequently, the conversation connection is made. Therefore, such an effect can be attained that there is no need for the caller to repeatedly call on the assumption that the called party might have forgotten to give the caller a return call.

Second Embodiment

The arrangement of the telephone system according to a second embodiment is the same as that shown in FIG. 2 of the first embodiment. The arrangement of the mobile terminal 1 is the same as that of the conventional one shown in FIG. 1, and the arrangement of the telephone terminal 4 is the same as that shown in FIG. 3 of the first embodiment.

A description will now be made about the operation.

Figure 5:
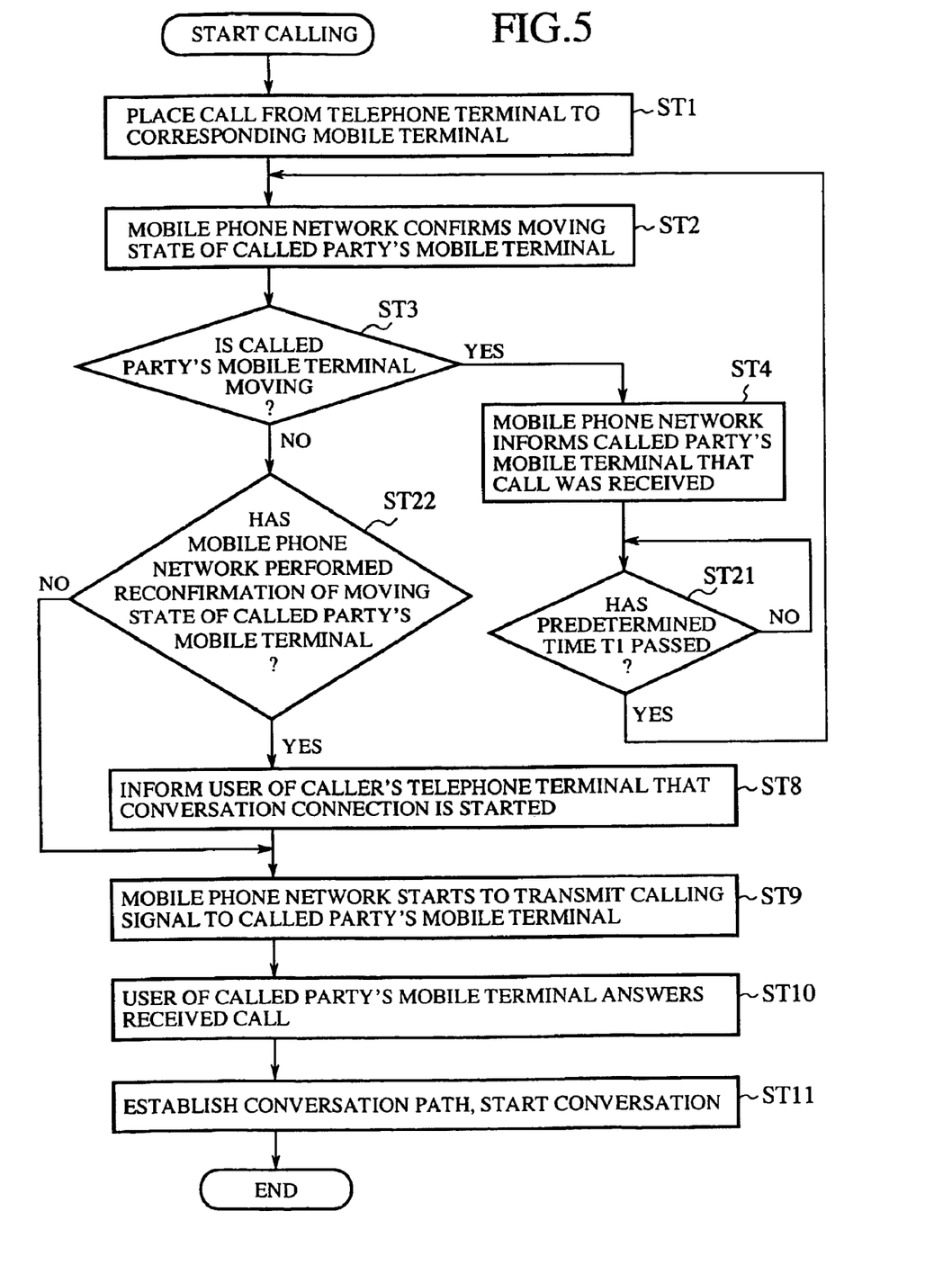
FIG. 5 is a flow chart showing the flow of processing in the telephone system according to the second embodiment of this invention.

FIG. 5 is a flow chart showing the flow of processing in the telephone system according to the second embodiment of this invention. The processing from step ST1 through step ST4 is the same as that shown in FIG. 4 of the first embodiment. In this embodiment, after the processing in step ST4, the mobile phone network 2 waits in step ST21 for a predetermined period of time T1. Thereafter, the process proceeds to step ST2 to thereby confirm the moving state of the called party's mobile terminal 1 once again.

Then, in step ST3, if the called party's mobile terminal 1 is found to be not moving, a judgment is made in step ST22 as to whether or not the mobile phone network 2 has already performed, at that point of time, the processing of re-confirming the moving state of the called party's mobile terminal 1. If the processing has already been performed, the user of the caller's terminal 4 is in a standby state after a lapse of the predetermined time T1. Therefore, in step ST8, the mobile phone network 2 notifies the user of the standby caller's terminal 4 through the ordinary telephone network 3 that the conversation connection to the called party's mobile terminal 1 will be started. In step ST9, the mobile phone network 2 starts to transmit a calling signal to the called party's mobile terminal 1.

If the re-confirmation of the moving state of the mobile terminal 1 has not been performed yet at the above-described step ST22, the user of the caller's telephone terminal 4 is not in the standby state after the lapse of the predetermined time T1. Therefore, the above-described step ST8 is omitted to thereby proceed to step ST9.

The processing at other steps ST10 and ST11 is the same as that shown in FIG. 4 in the first embodiment.

As described hereinabove, according to the second embodiment, even in the case where a call is received in a state in which the conversation connection is not made because the mobile terminal 1 is moving, the user of the called party's mobile terminal 1 can take an voluntary action, as a result of notification in step ST4, to enable him or her to perform a conversation, for example, by parking the automotive vehicle, if the notification was given during his vehicle driving state, in a safe roadside or the like. Therefore,such an effect can be obtained that the conversation connection can be made as soon as possible.

Further, according to the second embodiment, the user of the caller's terminal 4, i.e., the caller is automatically notified and is also connected for conversation at the time when the called party's mobile terminal 1 has come to a state in which he can now have a conversation connection. Therefore, such an effect can be obtained that there is no need for the caller to try to repeatedly call on the assumption that the called party might have forgotten to give the caller a return call.

Still further, according to the second embodiment, since there is no need to include the process of performing the repeated calling in the operation of the caller's telephone terminal 4 such an effect can be obtained that this invention can be applied to the conventional system, with the specification of the telephone terminal 4 unchanged.

Third Embodiment

The arrangement of the telephone system according to a third embodiment is the same an that shown in FIG. 2 of the first embodiment, and the arrangement of the telephone terminal 4 is the same as that shown in FIG. 3 of the first embodiment.

Figure 6:
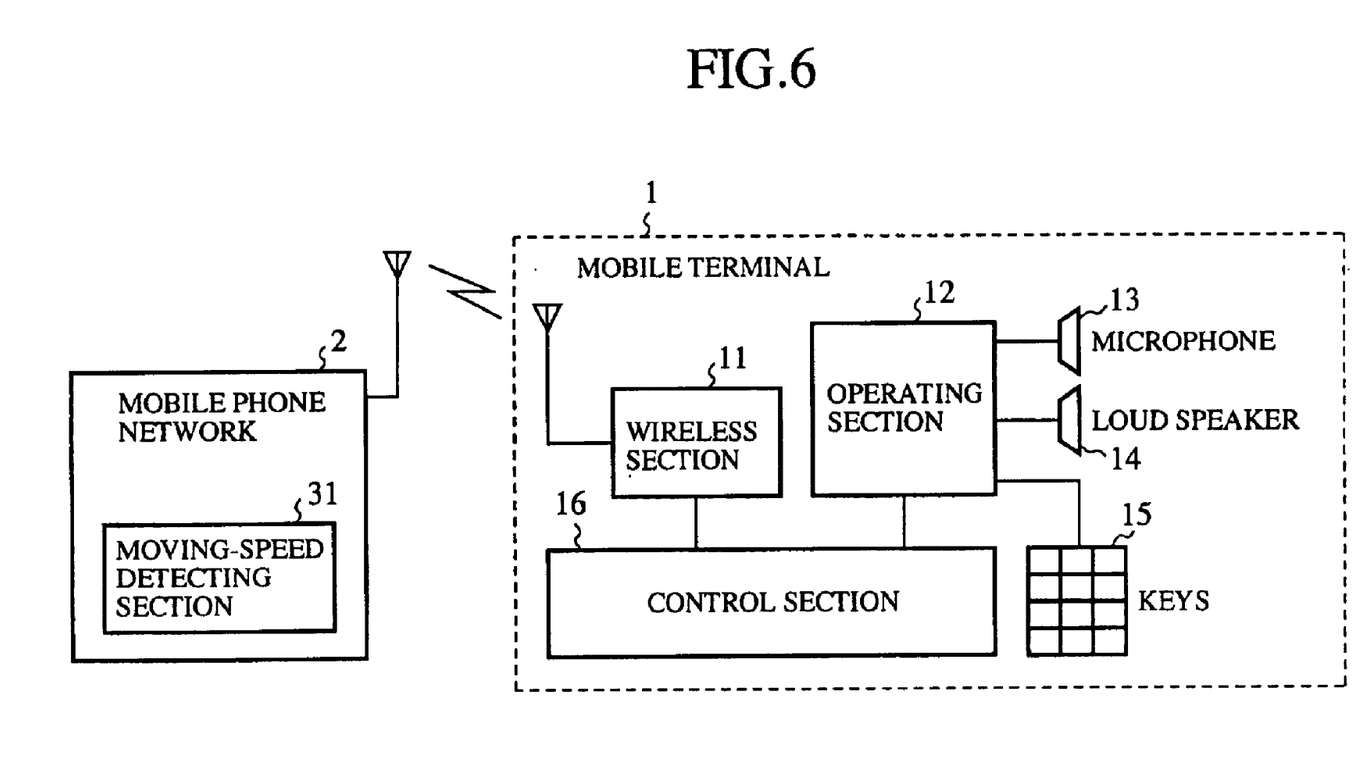
FIG. 6 is a block diagram showing an arrangement of a telephone system according to a third embodiment of this invention.

FIG. 6 is a block diagram showing an arrangement of the called party's mobile terminal 1 and the mobile phone network 2 according to the third embodiment. In the above-described first embodiment and second embodiment, the mobile terminal 1 is provided with the moving-speed detector 17. In this embodiment, on the other hand, the mobile phone network 2 is provided with a moving-speed detector 31 for detecting the moving speed of each of the mobile terminals 1.

A description will now be made about the operation.

The flow chart showing the flow of processing the telephone system according to the third embodiment is the same as that shown in FIG. 4 of the first embodiment or that shown in FIG. 5 of the second embodiment. Basically equivalent processing is performed as that in the first and second embodiments.

However, in step ST2 in FIG. 4 or FIG. 5, the moving speed detected by the mobile terminal 1 is appropriately notified when necessary to the mobile phone network 2 in the first and second embodiments. In this embodiment, on the other hand, since the moving-speed detector 31 of the mobile phone network 2 detects the moving speed of the mobile terminal 1, the notification of the moving speed from the mobile terminal 1 to the mobile phone network 2 is no longer required any more.

As described hereinabove, according to the third embodiment, even if a call is received in a state in which the conversation connection is not made because the mobile terminal 1 is moving, the user of the called party's mobile terminal 1 can take an voluntary action, as a result of the notification in step ST4, to enable him or her to make a conversation, for example, by parking the automotive vehicle, if the notification was given during his vehicle driving state, in a safe roadside or the like. Therefore, such an effect can be obtained that the conversation connection can be made as soon as possible.

Further, according to the third embodiment, the user of the caller's terminal 4, i.e., the caller is automatically notified and is also connected for conversation already at the time when the called party's mobile terminal 1 has come to a state in which he can now have a conversation connection. Therefore, such an effect can be obtained that there is no need for the caller to repeat calling on the assumption that the called party might have forgotten to give him or her a return call.

Still further, according to the third embodiment, since the mobile phone network 2 detects the moving speed of the mobile terminal 1, such en effect can be obtained that this invention can be applied to the system, with the specification of the mobile terminal 1 unchanged.

Industrial Applicability

As described hereinabove, the telephone system according to this invention is suitable for the one in which, even when a call is received in a state in which the conversation connection cannot be made because the mobile terminal is moving, the user of the called party's mobile terminal 1 can take a voluntary action to enable the conversation, whereby a conversation connection can be established as soon as possible.

What is claimed is:

1. A telephone system comprising:
   a caller's terminal;
   a called party's terminal; and
   a mobile phone network, said telephone system configured to provide communications between said caller's terminal and said called party's mobile terminal by way of said mobile phone network, wherein
   when a call is placed from the caller's terminal to the mobile terminal, said mobile phone network is configured to confirm a moving state of said mobile terminal;
   in the case where said mobile terminal is found to be moving, said mobile phone network is configured to notify said mobile terminal of the fact that a call was received, is configured to notify said caller's terminal of the fact that said mobile terminal is moving, to thereby cause said caller's terminal to place another call after a lapse of a predetermined time, and is configured to prohibit the mobile terminal from answering the received call; and
   in the case where said mobile terminal is found to be not moving, said mobile phone network is configured to transmit a calling signal to said mobile terminal.

2. The telephone system according to claim 1, wherein one of said mobile terminal and said mobile phone network comprises:

a moving-speed detector configured to detect the moving speed of said mobile terminal.

3. The telephone system according to claim 1, wherein said mobile terminal which has been notified of the fact that a call was received from said mobile phone network is configured to notify the user of said mobile terminal of the received call.

4. The telephone system according to claim 1, wherein in the case where said mobile terminal is not moving and where said caller's terminal has already placed another call, said mobile phone network is configured to notify said caller's terminal of the fact that a conversation connection is started.

5. A method for communicating between a caller's terminal and a called party's mobile terminal by way of a mobile phone network, comprising:

when a call is placed from the caller's terminal to the mobile terminal, said mobile phone network confirming a moving state of said mobile terminal;

in the case where said mobile terminal is found to be moving, notifying said mobile terminal by said mobile phone network of the fact that a call was received, notifying said caller's terminal of the fact that said mobile terminal is moving, to thereby cause said caller's terminal to place another call after a lapse of a predetermined time, and prohibiting the mobile terminal from answering the received call; and in the case where said mobile terminal is found to be not moving, transmitting a calling signal from said mobile phone network to said mobile terminal.

6. The method according to claim 5, further comprising:

detecting a moving speed of said mobile terminal by one of said mobile terminal and said mobile phone network.

7. The method according to claim 5, further comprising:

notifying the user of said mobile terminal of the received call.

8. The method according to claim 5, further comprising:

in the case where said mobile terminal is not moving and where said caller's terminal has already placed another call, sending a notification from said mobile phone network to said caller's terminal that a conversation connection is started.

* * * * *